United States Patent

Stowell et al.

[15] 3,647,473

[45] Mar. 7, 1972

[54] MALTING GRAIN

[72] Inventors: Keith Christopher Stowell, Newark; Peter Michael Howlett, Newark-on-Trent, both of England

[73] Assignee: A.B.M. (Malting) Limited, Newark-on-Trent, England

[22] Filed: July 15, 1968

[21] Appl. No.: 745,038

[30] Foreign Application Priority Data

July 21, 1967 Great Britain......................33,680/67

[52] U.S. Cl....................................99/52, 99/278, 195/71, 195/101, 146/281
[51] Int. Cl........................................................C12c 1/00
[58] Field of Search....................195/69, 70, 71, 130; 99/50, 99/51, 52, 53; 146/250, 221.5, 241, 281; 241/101

[56] References Cited

UNITED STATES PATENTS

| | | | |
|---|---|---|---|
| 113,770 | 4/1871 | Hoffmann | 146/281 |
| 3,193,470 | 7/1965 | Macey et al. | 195/71 |
| 3,443,958 | 5/1969 | Dennis et al. | 99/52 |

FOREIGN PATENTS OR APPLICATIONS 786,973 11/1957 Great Britain..............................99/53

OTHER PUBLICATIONS

Lake, J. R., " Harvesting Malting Barley," J. of Inst. of Brewing, Vol. 72, p. 411, 1966

*Primary Examiner*—A. Louis Monacell
*Assistant Examiner*—Gary M. Nath
*Attorney*—Paul H. Smolka

[57] ABSTRACT

A process and apparatus for dehusking cereal grain by a dry mechanical method at a temperature not above about 105° F., and wherein the moisture content of the grain is above about 8 percent by weight in order to damage the grain so that substantial rootlet growth is prevented without substantially damaging the aleurone layer. The dehusked grain is subsequently malted and there are advantages compared with conventional malting of husked grain.

20 Claims, 6 Drawing Figures

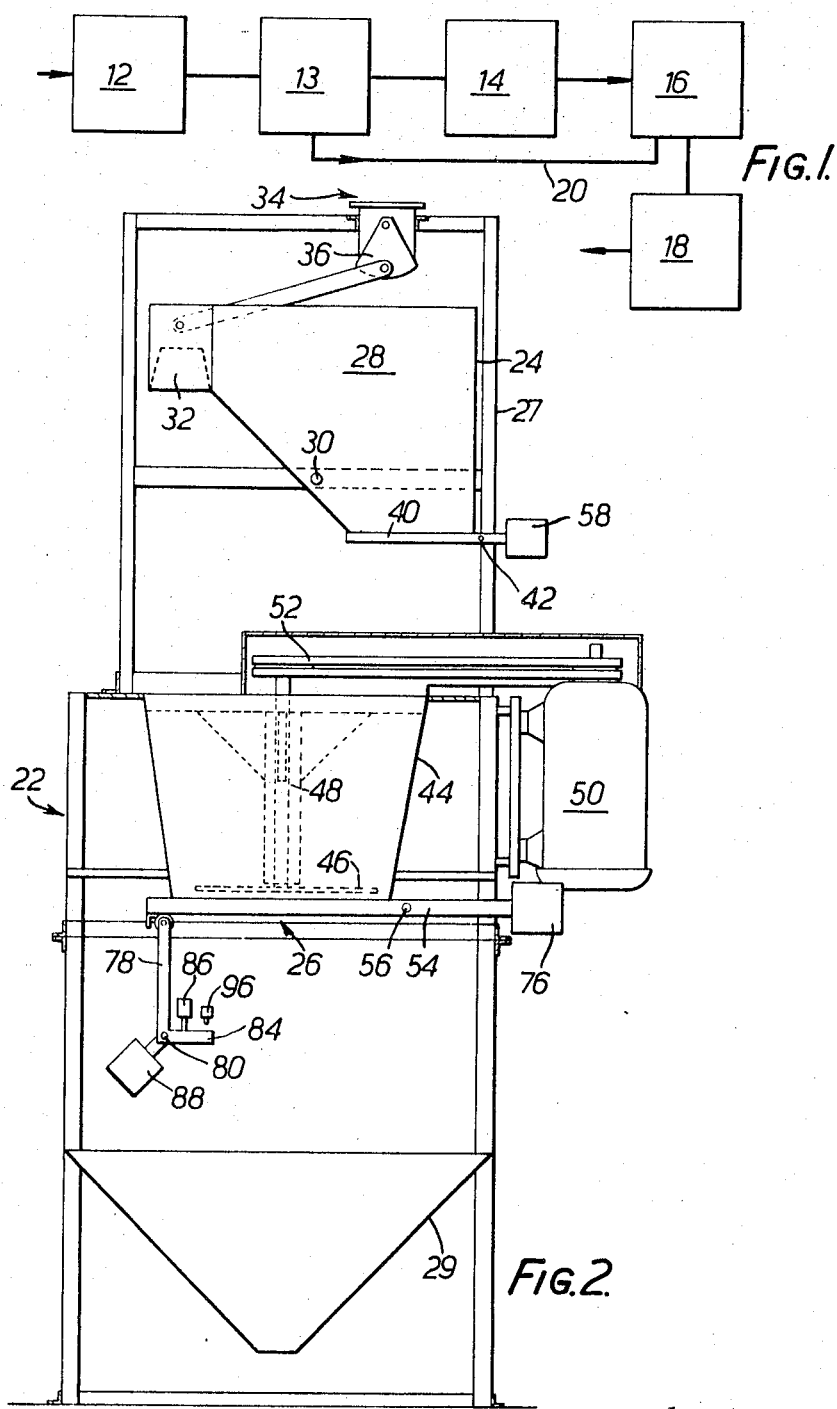

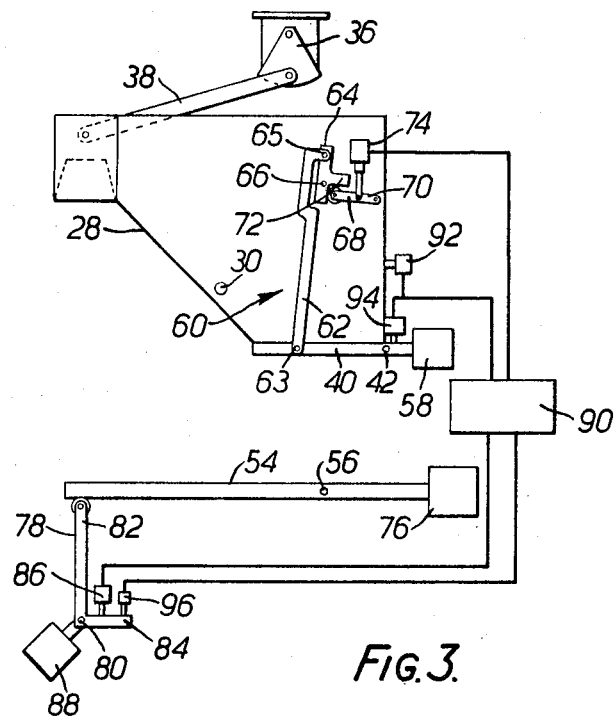
FIG. 3.
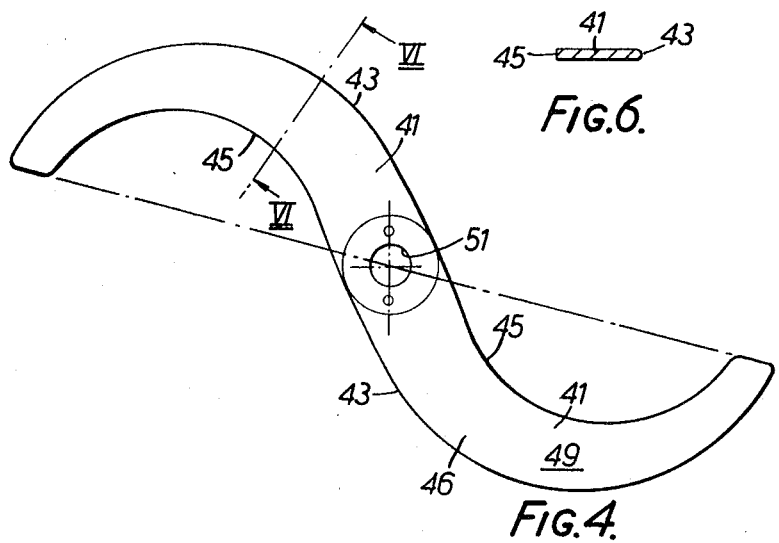
FIG. 6.
FIG. 4.
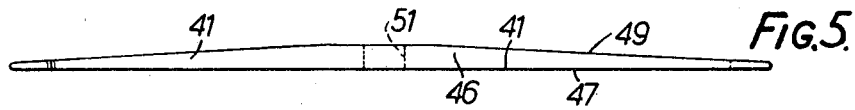
FIG. 5.

MALTING GRAIN

The invention concerns improvements relating to the malting of cereal grains, for example the malting of barley for use in brewing or distilling.

By conventional procedure the selection of grain for malting has always required that the husk of the barley is undamaged. A damaged husk usually indicated that mechanical damage to the grain had occurred during harvesting or handling of the grain prior to purchase impairing the malting quality of the grain.

Thus, undamaged husked grain has been used for malting. Briefly, in known practice, the husked grain is steeped in water, then cast or floored to germinate with the development and growth of the acrospire and possibly rootlets. The floored grain may be sprinkled with water. During germination the grain respires, and enzymes develop which convert the proteins and starch of the grain into simpler substances which are more soluble and/or diffusible. When germination has proceeded to a required extent it is arrested by kilning the grain, which is thereafter screened to remove the bulk of the rootlets. The malting loss, as measured by the loss in dry weight of material in processing barley into malt, is represented by a steeping loss, the grain respiration loss, and the screening loss.

During the steeping or germination period additives may be applied to regulate the malting process, in particular chemical additives may be included in the steep water and/or the flooring sprinkle water. For example, gibberellic acid, or sodium, potassium, calcium or other bromate, or a combination of the acid and bromate may be applied in accordance with any of U.K. Pat. Nos. 792,272, 993,521, 993,522, 988,618, and 1,007,286.

We have now found that malted cereal grain can be prepared by removing husk from the grain by a dry mechanical method damaging the grain so that substantial rootlet growth is prevented without substantially damaging the aleurone layer thus allowing the dehusked grain to malt.

The invention provides a process of preparing malted cereal grain comprising the steps of removing husk from the grain by a dry mechanical method damaging the grain so that substantial rootlet growth is prevented without substantially damaging the aleurone layer and malting the dehusked grain.

The expression "dry" in relation to the mechanical removal of husk is used herein merely to exclude wet methods wherein the grain is slurrified for dehusking and does not limit the invention to the removal of husk from completely dry grain.

The invention also provides malted cereal grain when prepared by such a process.

The invention also provides a process of producing wort wherein such malted grain is mashed.

The invention also provides wort wherein produced by such a process.

The invention also provides a product produced using such wort as a raw material.

Preferably at least 95 percent by weight of the total husk of the grain is removed and preferably the temperature during dehusking does not rise above about 90° F. but in some cases temperatures up to or a little above 100° F. may be used but in any case it is preferred that the temperature does not rise above about 105° F.

Although the husk is removed without substantially damaging the aleurone layer of the grain, certain damage to the embryo occurs and damage to other areas may occur. The damage to the embryo is sufficient to prevent substantial rootlet growth.

The invention goes contrary to known practice, but is believed to include advantages as follows:
1. More rapid uptake of moisture by the corn allowing a reduction in steeping time.
2. Rate of modification (as judged by the development of extract and soluble protein) increases thus allowing reduction of the germination period.
3. A reduction in the malting loss.

The overall advantage of the first two advantages mentioned above is to significantly reduce the processing time for the malting procedure, and the third advantage improves the yield for the conversion of barley into malt.

In addition, as the husk is removed prior to the malting process (normally 7–10 percent of the weight of the barley) the throughput of the plant can be increased by this percentage, in addition to any increases arising from the reduction in the processing time.

A still further advantage arises from the fact that the husk of the grain causes difficulties which hinder the malting process (dormancy and water sensitivity) and by removing the husk these problems are very much reduced.

Preferably during the steeping and/or germination stage of the malting process, chemical additive is employed to regulate the malting process. Additive may be included in the steep water and/or floor sprinkle water at the germination stage, and may include gibberellic acid and/or a bromate, basically as indicated above. However, another important advantage of the invention is that apparently the reaction of the dehusked grain to these chemical additives is more pronounced than the comparatively docile reaction of normal husked grain and therefore by comparison substantially less of an additive or combination of additives is used to produce a desired effect.

Preferably not more than 0.25 parts per million by weight of gibberellic acid are used with respect to the dry weight of grain. Preferably between 50 and 100 parts per million by weight of bromate (calculated as potassium bromate) are used with respect to the dry weight of grain.

For example, in a typical known process of malting barley an additive treatment comprises a water sprinkle with 0.25 parts per million of gibberellic acid and 100 parts per million (calculated as potassium bromate) of potassium, sodium or calcium bromate, with respect to the dry weight of barley.

With the invention comparable results can be obtained using only 50 p.p.m. of the bromate, that is half normal, together with the same amount of gibberellic acid.

Alternatively, comparable results can be obtained using a normal amount of additive, but more rapidly.

In a process of producing beer wherein malted grain is used as produced by the process described, husks removed from grain prior to malting are, for example, introduced at a stage subsequent to malting, for example by introduction into the mash. The husks can have an advantageous effect in the subsequent stages of the brewing process and on the resulting beer, and introduction into the mash facilitates subsequent filtration thereof.

The invention also provides malting plant comprising dehusking means for removing husk from cereal grain damaging the grain so that substantial rootlet growth is prevented without damaging the aleurone layer, and means for malting the dehusked grain.

The invention also provides wort production plant comprising such malting plant and mashing means adapted to receive malted grain from the malting means of said plant.

The invention is hereinafter described in further detail by way of example and not by way of limitation.

For malting barley, prior to malting the barley it is dehusked by mechanical means, without shattering the endosperm or causing to the grain a degree of damage which would impair its function in malting. The barley for dehusking is normally taken as it comes, and no special steps are taken to adjust its moisture content providing the moisture content is between 8 and 16 percent by weight; below 8 percent excessive shattering of grain may occur and above 16 percent the dehusking time may be excessive. The dehusking action is distinct from that in the known dehusking of barley or oats to improve the feed value, where the endosperm is shattered into grits which are only suitable for flaking or grinding into a flour.

The dehusking can be effected by any suitable apparatus. One example of such apparatus comprises a hemispherical bowl symmetrical about a vertical axis with alloy propeller blading in the base comprising two swept back generally curved blades, each of which presents a blunt leading edge which is radiused and polished; the blading rotates about said axis at about 2,500 r.p.m. The blading is rotated by an electric motor. With this action only the husk of the grain is removed. A small percentage of corns are broken (about 2 percent) but the aleurone layer of the corn is undamaged and the embryo is not removed; broken corns are removed before malting. The aleurone layer appears to have great importance in initiating the enzyme activity necessary for modification. The grain is very slightly damaged at the rootlet end and this apparently has an advantage in relation to malting. The apparatus provides a consistent supply of dehusked barley. Grain size is immaterial whereas moisture content can significantly affect the degree of dehusking and subsequent germination. Typical variations which may occur are shown in Table I; these results should only be considered as relative to each other since a change in blading characteristic can significantly shift the balance in either direction.

TABLE I

| Barley moisture content, percent | 9.0 | 11.0 | 14.0 | 16.0 | 18.5 |
| --- | --- | --- | --- | --- | --- |
| Dehusking time 1 min.: | | | | | |
| Percent husk | 7.1 | 6.5 | 3.1 | 1.9 | 1.4 |
| Percent germination | 97 | 99 | | | |
| Dehusking time 2 mins.: | | | | | |
| Percent husk | 11.3 | 10.1 | 5.0 | 4.1 | 2.9 |
| Percent germination | 96 | 98 | 99 | | |
| Dehusking time 3 mins.: | | | | | |
| Percent husk | 19.6 | 12.9 | 7.4 | 6.6 | 4.1 |
| Percent germination | 89 | 93 | 100 | 100 | |

NOTE.—Germination assessed as percent viable acrospires. Husk assessed as percent husk removed with respect to barley weight.

The dehusked barley occupies about 90 percent of the volume of ordinary barley, weight for weight. Thus effective barley storage increases by about 10 percent.

Handling of the dehusked material present no difficulty throughout the processing, and existing plant should cope adequately.

Preferably the grain is steeped to a moisture content between 1 and 2 percent below the normal requirement for steeped grain which has not had its husk removed. Preferably the steeped grain is sprinkled to a moisture content between 1 and 2 percent below the normal requirement for steeped and sprinkled grain which has not had its husk removed.

Concerning steeping, Table II shows comparative rates of water uptake of husked and dehusked barley, for various steeping times at various temperatures. The water uptake is given as percent of steeped grain weight.

TABLE II

| Temperature | De-husked barley, percent | | |
| --- | --- | --- | --- |
| | 55° F. | 65° F. | 75° F. |
| Steeping time: | | | |
| 8 hrs | 32.4 | 34.4 | 37.4 |
| 24 hrs | 39.2 | 42.5 | 43.2 |
| 32 hrs | 40.2 | 42.5 | 44.2 |
| | Husked barley, percent | | |
| 8 hrs | 30.9 | 33.7 | 35.2 |
| 24 hrs | 37.7 | 39.3 | 41.6 |
| 32 hrs | 38.7 | 41.2 | 43.5 |

The results shown in Table II indicate that the rate of uptake of water is significantly increased by dehusking, and if steeping with no interim rest periods is adopted about a 25 percent saving in time is possible. However, it has been found that the introduction of a substantial rest period during steeping permits a greater overall saving in time and thus an overall steep time of 30 hrs. raises the grain moisture content to about 41 percent.

On flooring or casting, heavy sprinkling can be applied so that a final moisture level of about 43 percent is achieved. Raising the moisture content above this level does not substantially increase the rate of modification, as determined by the standard index of modification, but at a lower moisture percentage (40 percent) the germination period will be slightly extended.

During flooring, modification proceeds with no or substantially no development of rootlet growth although a very small acrospire sometimes emerges. Consequently, the final volume of the grain is about three-quarters of that normally found if equal weights are compared. The analytical development of the malt and physical breakdown proceed very quickly between 24 hours and 48 hours after casting but during this period the respiration rate does not appear to be greater than the peak obtained under normal conditions (500 mg. $CO_2$/kg. dry wt./hr.). Therefore, no excessive demands are made on air supply and refrigeration capacity in existing plant. The malting loss is about 2.5 percent; about one-third of this arises during steeping and the remainder must be respiration loss. There is a steep rise in the malting loss after modification has been completed and if the germination period is not carefully regulated an over-modified malt is quickly obtained.

The process is extremely sensitive to chemical additive, as illustrated by reference to Table III, which shows results and trends of additive treatment comprising in the sprinkle water applied during germination gibberellic acid (GA) or a combination of GA plus a potassium, sodium or calcium bromate (Br). Normal treatment comprises 0.25 p.p.m. GA with respect to barley weight, here called NGA, and 100 p.p.m. Br with respect to barley weight, here called NBr. The Table shows the results after various periods of flooring or germination, at (a) with a treatment of NGA plus ½ N Br (i.e., 50 p.p.m. Br) at comparison 'air-on' or flooring temperatures of 60° F. and 70° F., and at (b) with a treatment of either NGA or NGA plus N Br, at a temperature of 60° F.

TABLE III (a) Comparison air on temperatures 60° F. and 70° F. Additive treatment NGA plus ½N Br

| Time | 24 hrs. | | 48 hrs. | | 60 hrs. | |
| --- | --- | --- | --- | --- | --- | --- |
| Temperature, ° F | 60 | 70 | 60 | 70 | 60 | 70 |
| Dry extract (lbs./qr.) | 58.4 | 84.4 | 101.1 | 104.1 | 108.7 | 109.2 |
| Cold water extract, percent | 5.3 | 12.6 | 15.0 | 17.3 | 19.9 | 23.4 |
| Permanently soluble nitrogen, percent | 0.19 | 0.31 | 0.39 | 0.49 | 0.52 | 0.64 |
| Malting loss, percent | | | | | 2.4 | 4.9 |

(b) Comparison additive treatments NGA and NGA plus N Br

| Time | 24 hrs. | | 48 hrs. | | 72 hrs. | |
| --- | --- | --- | --- | --- | --- | --- |
| Additive | NGA | (1) | NGA | (1) | NGA | (1) |
| Dry extract (lbs./qr.) | 70.0 | 68.5 | 106.1 | 105.4 | 111.3 | 110.3 |
| Cold water extract, percent | 6.5 | 6.2 | 17.1 | 15.5 | 20.4 | 19.1 |
| Index of modification, percent | 21 | 18 | 50 | 26 | 51 | 31 |

NOTE.—Dry extract, cold water extract, permanently soluble nitrogen, and index of modification are all as determined by the recommended methods of The Institute of Brewing, London, England.

[1] NGA plus N Br.

Thus, for example, within the additive range NGA with no bromate to NGA with normal bromate, the malt index of modification may vary after 72 hours flooring from 51 down to 31, and a range of between 60 and 30 is possible. Germination temperature is also influential, a rise of the 'air-on' temperature from 60° F. to 70° F. in effect reducing the period for comparable germination by 12 hours.

Preferred ranges of additives in the sprinkle water can involve useful saving as compared with the ranges normally used.

Concerning kilning, no substantial difference exists between the drying rates of husked and the present dehusked malt. Compared to husked malt, the initial volume occupied by the dehusked malt is about 75 percent, but if kiln malts are compared as after the usual malt screening, the bulk densities are about equivalent. The dehusked malt tends to take color more easily on the kiln, but providing the Cold Water Extracts are kept within the normal range of brewing malt the color uptake can be controlled. Moisture levels of under 3 percent might not be obtained while keeping the malt color within the usual specification range since the high temperature necessary to reduce the malt moisture may cause excessive color development.

Malt screening is unnecessary in the present process, as roots are not developed during modification. Moreover, intensive screening might remove the embryo altogether and its loss would cause in effect an increase in malting loss and thus make the process less economic. However, under certain brewing circumstances removal of the embryo after malting and prior to brewing might be beneficial since it is known that certain fatty material which is extracted from the embryo can adversely affect the head retention in the beer.

The malted grain is mashed to produce a wort which for example in the production of beer or distilled spirits, such as whisky, is fermented by the addition of yeast. Alternatively, for example the wort is concentrated to a wort syrup.

The analysis and brewing properties of the dehusked malt will now be considered; all appropriate parameters are as determined by the Recommended Methods of the Institute of Brewing, London, England. In view of the fact that the husks have been removed all the analytical values of the malts are raised by 6–7 percent. Consequently, a normal ale analysis for dehusked malt of ale-brewing quality would be in the order of Dry Extract: 109 lbs., Cold Water Extract: 20 percent, Index of Modification: 40, whereas a typical lager malt would have a Congress Analysis with a dry extract of 87 percent and Kolbach Index of 43 percent. Obviously, 100 qrs. of dehusked malt would be equivalent in brewing yield to about 106 qrs. of normal malt. There is a tendency for the Diastatic Power of malts made by the present process to be slightly lower (10–20 percent) than normal but since they are so well modified they convert during brewing in about half the time taken by a normal ale malt. The brewing worts are rich in α-amino nitrogen which is valuable for yeast feeding during fermentation and also the wort pH's are slightly lower than normal. Thus, 100 percent utilization of this malt in mashing will produce a wort with a pH value 0.3 to 0.4 units lower than the value expected with a normal wort. Since this lowering of pH of the wort is often required by brewers it normally has to be artificially achieved by alternative treatments. The use of dehusked malt would apparently confer this benefit to the brewer without incurring additional costs to the process.

We believe there are numerous advantages to be given to the beer quality when using dehusked malt as described. Thus, due to a reduction in the anthocyanogen content of the beer the haze stability is improved and by adjusting the amount of husk used in the mash the beer flavor can be modified to suit various circumstances. In other respects the beer properties arising from the use of dehusked malt appear to be normal in comparison with the beers from malts made by the usual manufacturing process.

In a process of producing beer, the resultant malted grain may be mashed to produce wort, as a complete replacement for ordinary malted grain. In this case, husks removed from grain prior to malting are for example reintroduced at a stage subsequent to malting, for example by introduction into the mash, as indicated above. Husks may be reintroduced in the same proportion to the dehusked grain after malting as occurs with the original husked grain, or possibly in any desired lesser or greater proportion. Preferably between 50 percent and 100 percent by weight of husk removed is introduced into the mash, for example substantially 100 percent.

Alternatively, the resultant malt may be mashed as an adjunct of normal malted grain for example in the proportion of not more than 50 percent, e.g., between 25 and 50 percent with respect to the total weight of malted grain. Its virtue would be in its high extract yield, an abundance of yeast feeding properties and wort pH adjustment. These factors would all be of considerable value to any brewer using high adjunct rates and thus this malt would be a good aid for providing a balanced wort.

The malt could be ground using the normal brewery milling equipment although since the product is well modified an adjustment of the roller settings might be necessary. Alternatively the malt germination could be stopped after it has progressed for 48 hours which would then yield a normal modified product which may be cheaper than ordinary malt and which could be grounded by a normally set mill.

Also in a distillation process, the resultant malt may replace ordinary malt in the mash tun either completely or partially by for example not more than 50 percent e.g., between 25 and 50 percent with respect to the total weight of malted grain without causing filtration problems. Also, absorption of peat reek can be better with the dehusked malt in comparison with the normal product.

Reverting to the malting process, removal of the husk as described from dormant and water-sensitive barley has been found to break dormancy and reduce the degree of water sensitivity. Thus except when prolonged storage is necessary the dehusking process may reduce the need and therefore the expense of drying the conditioning barley. Furthermore, the so-called nonmalting varieties may make comparatively better malt by a dehusked process than by conventional techniques.

Economics of the present process are illustrated by the following example:

An 8 percent loss in barley weight due to removal of husk, and a 2 percent loss in barley weight due to endosperm shattering, gives an overall loss in barely weight 10 percent.

If barley is costed at 90/- qr. the weight loss will add 10/- to the cost of 1 qr. of barley as ready for malting. However, the offal has a resale value of about £8 per ton which reduces the overall loss to about 7/- qr. Consequently, the weight loss arising from the dehusking will add about 7/- to the cost of 1 qr. (4 cwts.) of barley as ready for malting.

During the processing there is a saving in malting loss of between 3½ to 4 percent which is approximately equivalent to 7/- qr. Thus as an overall balance the weight losses arising from dehusking are compensated by the saving in malting loss.

Moreover, the husks may be reintroduced subsequent to malting as described above.

We believe that the potential saving can be summarized as follows:

1. Increased throughput, for example of up to 50 percent, in steeping and germination capacity.
2. Greater potential use of dormant and farm-dried barley without special drying and conditioning.
3. Cheaper and/or better malt products for the brewer.

The invention has been described above with reference to barley grain, but it is applicable to other cereal grain for malting such as wheat.

There now follows a description, to be read with reference to the accompanying drawings, of brewing plant embodying the invention. This description, which is also illustrative of method aspects of the invention, is given by way of example of the invention only and not by way of limitation thereof.

In the drawings:

FIG. 1 shows a diagrammatic view of the plant embodying the invention;

FIG. 2 shows a diagrammatic view of grain-dehusking apparatus;

FIG. 3 shows a diagrammatic view of parts of the apparatus, illustrating the operation thereof;

FIG. 4 shows a plan view of a rotor of the apparatus;

FIG. 5 shows a side view corresponding to FIG. 4; and

FIG. 6 shows a section on the line VI—VI of FIG. 4.

The brewing plant (FIG. 1) embodying the invention comprises grain-dehusking apparatus 12, a separator 13, malting means 14, mashing means 16 and means 18 for converting mash into beer.

In the operation of the plant husk is removed from barley grain in the apparatus 12 and the husk is separated from the dehusked grain in the separator 13; the grain then passes to the malting means 14, where it is malted; the malted grain is then mashed with water and conventional adjuncts in the mashing means 16; mash from the mashing means 16 then passes to the means 18 where it is converted into beer by conventional processing. Each of the separator 13, malting means 14, mashing means 16 and means 18, is known and forms no part of the present invention per se. Husks separated in the separator 13 are, for example, added to the mash in the mashing means 16; passage of the husks to the mashing means 16 is indicated at 20. Any broken corns are removed from the dehusked grain before it is malted.

The dehusking apparatus 12 (FIGS. 2 and 3) comprises dehusking means 22 for removing the husk of the barley grain, a weigher 24 for metering a batch comprising a required weight of barley to the dehusking means 22, a door assembly 26 adapted for use in removing the dehusked batch of grain from the dehusking means 22, a discharge hopper 29 and means (FIG. 3) for so controlling the apparatus that when the apparatus is in use a plurality of cycles of operation are carried out consecutively in each of which a weighed batch of grain is metered to the dehusking means 22, the batch is dehusked and the dehusked batch is removed through the door assembly 26 and passes, via the hopper 29 to the separator 13.

The apparatus comprises a rectangular framework 27.

The weigher 24 comprises a weigh hopper 28 mounted for pivotal movement about a horizontal pivot 30 secured in the framework 27. A weight 32 is secured on the hopper 28 and urges it anticlockwise about the pivot 30. The weigher 24 also comprises an inlet valve 34 communicating with a bulk supply of barley (not shown); a valve member 36 of the valve 34 is linked to the hopper 28 by a link 38 (FIG. 3). The weigher also comprises an outlet door 40 which is mounted for pivotal movement about a horizontal pivot 42 secured adjacent a lower, outlet, portion of the hopper 28.

The dehusking means 22 comprises a bowl 44 having an inverted frustoconical shell secured in the framework 27 with its axis vertical and adapted to contain barley grain to be dehusked. A rotor 46 is mounted on a vertical shaft assembly 48 for rotation about said vertical axis in a lower portion of the bowl 44. The apparatus comprises an electric motor 50 secured on the framework 27 and arranged to drive the rotor 46 via a belt drive 52 and the shaft assembly 48, so that husk is removed from the grain damaging the grain so that substantial rootlet growth is prevented without damaging the aleurone layer.

The rotor 46 (FIGS. 4 to 6) comprises two sweptback generally curved blades 41 which together present a generally S-shaped profile in plan view. Each blade 41 presents a blunt leading edge 43 which is flame-cut, radiused and polished, and a trailing edge 45 which is flame-cut and rough ground. Each blade 41 comprises a horizontal brushed black plate lower face 47 (FIG. 5) and a rough machined upper face 49 which slopes downwardly from a central portion of the rotor 46. A bore 51 is provided in the central portion for securing the rotor 46 to the shaft assembly 48.

A device (not shown) arranged to vary the speed of the rotor is also provided. The speed may be varied according to the characteristics of the barley used.

The door assembly 26 comprises a door 54 which is mounted for pivotal movement about a horizontal pivot 56 secured in the framework 27 adjacent a lower, outlet, portion of the bowl 44.

The hopper 29 is secured in the framework 27.

The door 40 has a balance weight 58 (FIGS. 2 and 3) mounted thereon. A toggle linkage 60 is connected to the door 40 and is arranged to open and close the door 40 as required. The toggle linkage 60 comprises a link 62 pivoted to the door 40 at 63 and also pivoted at 65 to a bell crank member 64 which is pivoted to the hopper 60 by a horizontal pivot 66. An arm 68 is pivoted to the hopper 28 by a horizontal pivot 70; the arm 68 is adapted to engage an arm 72 of the member 64. The arm 68 is connected to a solenoid 74 which is arranged to move the arm 68 about its pivot 70. When the apparatus is in use and the hopper 28 contains a batch of the required weight, the solenoid 74 moves the arm 68 anticlockwise about its pivot 70 and the arm 68, engaging the arm 72, moves the bellcrank member 64 clockwise about its pivot 66 to break the toggle linkage 60 and allow the door 40 to open to deliver the batch of grain to the bowl 44. When the hopper 28 is empty the door 40 is returned to its closed position by the action of the weight 58, the toggle linkage being remade by the movement of the door 40 to hold the door 40 in its closed position.

The door 54 has a balance weight 76 mounted thereon. The door assembly 26 comprises two spaced bellcranks 78 (only one of which is shown) arranged to open and close the door 54 as required. Each bellcrank 78 is pivoted in the framework 27 on a horizontal shaft 80. The bellcrank 78 comprises an arm 82 on which is mounted a free roller which is adapted to engage the door 54. The bellcrank 78 also comprises an arm 84 adapted to engage a solenoid 86 arranged to move the bellcrank 78 about its shaft 80. A balance weight 88 is also connected to the shaft 80 between the two bell cranks 78. When the apparatus is in use and the rotor 46 has been rotating for a required time, the solenoid 86 moves the bellcranks 78 clockwise and the weight of barley in the bowl 44 causes the door 54 to open to deliver the batch of barley to the hopper 27, the arm 84 swinging away from the solenoid 86. When the bowl 44 is empty the door 54 is returned to its closed position by the action of the weight 76, the weight 88 returning the bellcranks 78 to their position as shown in FIG. 3 to hold the door 54 in its closed position.

The control means of the dehusking apparatus (FIG. 3) comprises a timer device 90 of known type which forms no part of the present invention per se. The control means also comprises microswitches 92, 94, 96, each of which is of known type and forms no part of the present invention per se.

In the cycle of operation of the apparatus the rotor 46 rotates continuously at a constant blade tip speed between 100 and 400 ft./second, which corresponds approximately to between 1,500 and 5,000 r.p.m. with a rotor diameter of 18 inches; initially the hopper 28 is empty. The empty hopper 28 is urged by the weight 32 anticlockwise about its pivot 30 to move the valve member 36 via the link 38 so that the valve 34 is open and barley grain enters the hopper 28 through the valve 34. As the grain enters the hopper 28 the hopper moves clockwise about the pivot 30 until the required weight is in the hopper 28, when the valve member 36 is in a position in which the valve 34 is closed. This movement of the hopper 28 operates the microswitch 92 which operates the solenoid 74 to cause opening of the door 40 via breaking of the toggle linkage 60; the weighed batch of barley then falls into the bowl 44; the depth of the weighed batch is between 1 foot and 2 feet 6 inches. The door 40 in opening operates the microswitch 94 which initiates operation of the timer 90.

After the required time, which is set on the timer 90, has elapsed the timer 90 operates the solenoid 86 to cause opening of the door 54 via the bellcranks 78; the dehusked barley then falls into the hopper 29.

While the barley is in the bowl 44 the hopper 28 again fills but the solenoid 74 does not operate again until the microswitch 96 is operated by the arm 84 on return of the bellcranks 78 to their position as shown in FIG. 3, on closing of the door 54.

One or more of the following modifications can be made:
a. The bell cranks 78 are replaced by a direct-acting hook catch integral with a magnetic release coil mounted in the framework 27.
b. Where auxiliary electric power supplies are not available the solenoids and microswitches are replaced by interlocking mechanical linkages.
c. The top faces of the rotor are horizontal.

It is believed that in the dehusking means 22 only the husk of the barley is removed and the embryo is damaged so as to prevent substantial rootlet growth. A small percentage of corns are broken (about 2 percent) but the aleurone layer of the corn is substantially undamaged.

The following Table IV shows typical results obtained with the dehusking apparatus described with reference to the drawings.

TABLE IV

Barley moisture content: about 15% by weight; Rotor diameter: 18 inches; Germination: assessed as percent viable acrospires; Rotor tip speed: 220 feet/second; Husk: assessed as percent husk removed with respect to barley weight

| Dehusking Time (minutes) | Percent husk | Percent germination |
| --- | --- | --- |
| 1 | 7.1 | 93 |
| 1½ | 9.6 | 90 |
| 2 | 11.2 | 78 |
| 2½ | 12.3 | 71 |

We claim:

1. A process for preparing malted cereal grain comprising the steps of
   a. dehusking grain by a dry mechanical method at a temperature not above about 105° F., and wherein the moisture content of the grain is above about 8 percent by weight so as to damage the grain sufficiently to prevent substantial rootlet growth without substantially damaging the aleurone layer and
   b. malting the so dehusked grain.
2. A process according to claim 1 wherein the grain comprises barley.
3. A process according to claim 1 comprising the step of employing a chemical additive to regulate the malting step.
4. A process according to claim 3 wherein the additive comprises a gibberellic acid.
5. A process according to claim 3 wherein the additive comprises a bromate.
6. A process according to claim 3 wherein the additive comprises gibberellic acid and a bromate.
7. A process according to claim 4 wherein not more than 0.25 parts per million by weight of gibberellic acid are used with respect to the dry weight of grain.
8. A process according to claim 7 wherein between 50 and 100 parts per million by weight of bromate (calculated as potassium bromate) are used with respect to the dry weight of grain.
9. A process according to claim 1 wherein at least 95 percent by weight of the total husk of the grain is removed.
10. A process of producing wort comprising the steps of
    a. mashing malted grain produced by a process according to claim 1 and
    b. introducing into the so-produced mash husk removed from the grain by the dehusking.
11. Malting plant comprising mechanical dehusking means for removing husk from cereal grain at a temperature not above about 105° F. and at a grain moisture content above about 8 percent by weight which damages the grain sufficiently to prevent substantial rootlet growth without substantially damaging the aleurone layer, and means for malting the dehusked grain.
12. Wort production plant comprising
    a. a malting plant which comprises mechanical dehusking means for removing husk from cereal grain at a temperature not above about 105° F. and at a grain moisture content above about 8 percent by weight which damages the grain sufficiently to prevent substantial rootlet growth without substantially damaging the aleurone layer, and means for malting the dehusked grain,
    b. mashing means for receiving malted grain from the said malting means and for mashing said grain to produce wort,
    c. means for separating husk from the dehusking means and
    d. means for introducing said separated husk into the said mashing means.
13. Plant according to claim 11 wherein the dehusking means comprises a chamber adapted to contain grain to be dehusked, rotatable blade means in the chamber, and means for rotating the blade means.
14. Plant according to claim 13 wherein the blade means presents a blunt leading edge.
15. Plant according to claim 13 wherein the blade means comprises a plurality of swept-back generally curved blades, each of which presents a blunt leading edge.
16. Plant according to claim 13 wherein said leading edge is radiused and polished.
17. Plant according to claim 13 wherein the chamber comprises an inverted frustoconical shell with its axis upright and the blade means is mounted in a lower portion of the chamber for rotation about said axis.
18. A process for preparing malted cereal grain comprising the steps of
    a. removing husk from the grain by a dry mechanical method at a temperature not above about 105° F. and wherein the moisture content of the grain is above about 8 percent by weight so as to damage the grain sufficiently to prevent substantial rootlet growth without substantially damaging the aleurone layer, the dry mechanical dehusking method comprising
       i. introducing the grain into an inverted frustoconical shell with its axis upright, and
       ii. rotating blade means in said shell about said axis, said blade means comprising a plurality of sweptback generally curved blades each of which presents a blunt leading edge, at a blade tip speed between 100 and 400 feet/second; and
    b. malting the dehusked grain.
19. A process according to claim 18, wherein the temperature during dehusking does not rise above about 105° F., and the moisture content of the grain to be dehusked is between 8 and 16 percent by weight.
20. A process according to claim 18, wherein the grain is introduced into the frustoconical shell until the depth of grain therein is between 1 foot and 2 feet 6 inches.

* * * * *